United States Patent [19]
Lee

[11] Patent Number: 5,529,838
[45] Date of Patent: Jun. 25, 1996

[54] WOOL FILTER FOR DUST-PROOF MASK COMPRISING A NONWOVEN FABRIC OF RANDOM WOOL FIBERS AND SLIT FILM FIBERS

[76] Inventor: Kwangyeon Lee, San 20-2, Daejeong-ri, Samsung-myun, Eumsung-kun, Chungchongbuk-province, Rep. of Korea

[21] Appl. No.: 381,765

[22] Filed: Feb. 1, 1995

[30] Foreign Application Priority Data

Dec. 21, 1994 [KR] Rep. of Korea ............... 94-35714

[51] Int. Cl.⁶ .................... B01D 24/00; B01D 39/02; B01D 39/08; B32B 5/06
[52] U.S. Cl. .................. 428/288; 55/522; 55/527; 55/528; 210/505; 210/507; 210/508; 428/296; 428/297; 428/303
[58] Field of Search .................. 428/296, 297, 428/303, 288; 55/522, 527, 528; 210/505, 507, 508

[56] References Cited

U.S. PATENT DOCUMENTS 5,262,234  11/1993  Minor et al. .................. 428/372

*Primary Examiner*—James Withers
*Attorney, Agent, or Firm*—Ladas & Parry

[57] ABSTRACT

A wool filter for a dust-proof mask is disclosed, in which wool fibers are mixed with chemical resin film slitting yarns so as to manufacture a non-woven fabric, thereby doubling the electrostatic force to improve the dust filtering function. In manufacturing the wool filter for a dust-proof mask, 40 to 90 weight % of wool yarns is uniformly mixed with 10 to 60 weight % of chemical resin film slitting yarns, preferably polyolefinic resin film slitting yarns.

5 Claims, 1 Drawing Sheet

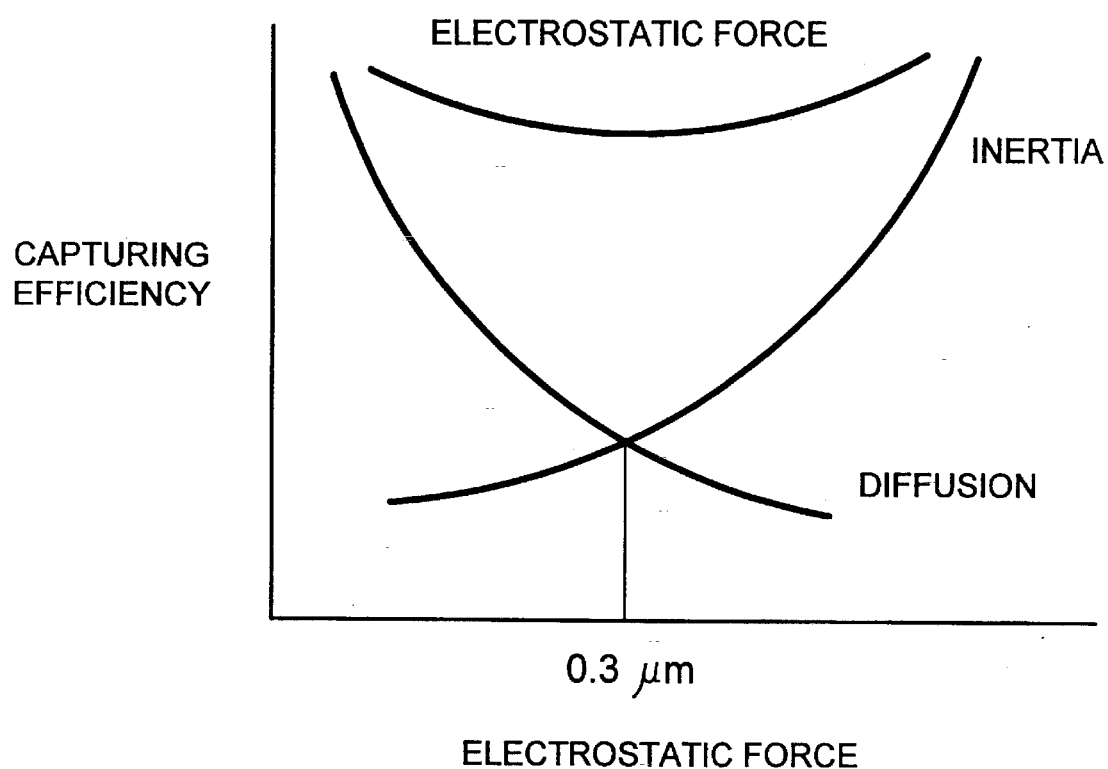
F I G. 1

WOOL FILTER FOR DUST-PROOF MASK COMPRISING A NONWOVEN FABRIC OF RANDOM WOOL FIBERS AND SLIT FILM FIBERS

FIELD OF THE INVENTION

The present invention relates to a wool filter for dust-roof mask and, more particularly, to a wool filter for dust-proof mask, in which wool fibers are mixed with chemical resin film slitting yarns which are actually in a form of fibrillated staple fibers so as to manufacture non-woven fabric, thereby doubling the electrostatic force to improve the dust filtering performance. The wool filter of the present invention is subjected to a hygienic treatment.

BACKGROUND OF THE INVENTION

Generally, a dust proof mask is used to prevent the inhaling of dust through the respiratory channel of the human body in places where the air contains a lot of dust i.e., in places such as coal mines, ship building yards, steel and iron manufacturing plants, wheat milling houses, fiber manufacturing factories, cement manufacturing plants, spray coating places and the like. Such a dust-proof mask employs a filter on the front or side thereof, i.e., at the air the inhaling path so as to capture dust particles.

Such a dust proof mask filter should have a low resistance against the inhaling and exhaling, and should be high in the dust capturing efficiency, as well as low in the manufacturing cost.

Natural fibers such as cotton and wool, or chemical fibers such as nylon, polyester, acrylonitrile, polypropylene, polyethylene and like may be used for the filter. In view of the resistance against the inhaling and exhaling, and in view of the dust capturing efficiency, wool is known to be the best, and wool is widely used in a form of felt.

However, wool alone is not sufficient for the function, and therefore, many attempts have been made to improve the physical properties of this material through chemical and physical treatments in the manufacturing process.

It is known to use wool felts which are formed by stacking and pressing wool fibers of yarn. However, in such a felt filter, a homogeneity cannot be obtained, and further, it is made by a batch type production so that mass production would be difficult. Further, it is insufficient in the resistance against inhaling and exhaling, and in dust capturing efficiency.

In order to solve the above described problems, various attempts have been made. For example, an electrostatic agent which is in a powder form and which promotes the electrostatic phenomenon is spread on the felt. As disclosed in Korean Patent Publication No. 90-2091, styrenic resin is mixed with petrolic resin or with alkyl phenol resin in an amount of 1 to 50 weight %, and this mixture is dissolved in a solvent such as methylene chloride, benzene, or toluene so as to prepare an impregnating resin solution. This solution is impregnated into non-woven fabric of wool, and then, the non-woven fabric is allowed to pass through rollers, so that a proper level of impregnation would be maintained. Then the non-woven fabric of wool is dried in a drier, thereby completing the chemical treatment for inducing electrostatic charges in the non-woven fabric.

The reason why electrostatic force is utilized is that the charged dust particles are captured by the electrostatic forces of the dust-proof mask filter. Further, even in the case of non-charged dust particles, they are charged by the electrostatic field of the filter, so that they would be captured in the same manner. Thus without increasing the resistance against inhaling and exhaling, the dust particles can be effectively captured.

The filter which utilizes the electrostatic forces is called an "electrostatic filter" in the art, and is capable of capturing even tiny dust particles by the electrostatic force.

Generally, a non-charged air filter captures dust particles mainly through the inertia and diffusion out of the capturing mechanisms. However, as shown in FIG. 1, the capturing efficiency through the two functions becomes the lowest around a particle size of 0.3 microns, with the result that particles of the sub-micron region can scarcely be captured. On the other hand, the electrostatic filter exerts a coulomb force and an electrostatic induction force in addition to the above mentioned two functions, with the result that larger amounts of particles can be captured in an effective manner.

However, the chemical treatment or resin treatment requires a separate process, and the chemicals or the resin particles may be inhaled into the human body. Particularly, in the case of an over-treatment, the gaps between the fibers are filled with the chemical or the resin, thereby increasing the resistance against the inhaling and exhaling.

In order to overcome the above described disadvantages, Korean Patent Publication No. 90-3634 which was filed by the present applicant discloses as follows. That is, by utilizing the fact that some chemical resin film has charge induction property, thin propylene film is stacked after thinly slitting it, and non-woven fabrics are attached on the upper and lower faces of the film. These dust proof filters have been commercialized.

However, in this product, the gaps between the fibers can be non-uniform, and the bound state is weak. Therefore, this product has to be used overlapped with a third non-woven fabric.

SUMMARY OF THE INVENTION

The present inventor has studied for many years how to solve the above described problems, and finally developed a new filter for the dust-proof mask. That is, chemical resin film slitting yarns are mixed with special hygienic treated wool yarns, and this mixture is subjected to the usual non-woven fabric manufacturing process.

Therefore it is an object of the present invention to provide a wool filter for a dust-proof mask, in which a chemical or resin treatment for inducing electrostatic charges is not applied, but the dust capturing efficiency is high, with the resistance against inhaling and exhaling being low.

It is another object of the present invention to provide a wool filter for a dust-proof mask, in which wool yarns so processed as to radiate far infrared rays, as to resist against bacteria and as to deodorize are used, so that the person using the filter can maintain and promote the health.

It is still another object of the present invention to provide a method for manufacturing a wool filter for a dust-proof mask, in which the filter is homogeneous, and can be manufactured continuously in large quantities.

BRIEF DESCRIPTION OF THE DRAWING

FIG. 1 is a graph illustrating capturing efficiency versus particle size in a filter.

DETAILED DESCRIPTION OF THE PREFERRED EMBODIMENT

In manufacturing the wool filter for a dust-proof mask, 40 to 90 weight % of a wool yarn is uniformly mixed with 10 to 60 weight % of a chemical resin film slitting yarn, thereby forming a thick non-woven fabric.

As the material of the chemical resin film, all kinds of chemical resins may be employed. Particularly it is preferable to use a polyolefinic resin such as polypropylene or polyethylene which is superior in the charge inducing property.

In the wool yarn, the usual one may be employed, but it is preferable to use a special wool yarn which is dipped into a bio-ceramic base solution to make the yarn radiate far infrared rays and resist against bacteria.

Now the wool filter for a dust-proof mask and the manufacturing method therefor according to the present invention will be described in detail.

In manufacturing the wool filter for a dust-proof mask according to the present invention, 40 to 90 weight % of wool yarns is uniformly and randomly mixed with 10 to 60 weight % of chemical resin film slitting yarns which are actually in a form of fibrillated staple fibers. More preferably, 60 to 80 weight % of wool yarns is uniformly mixed with 20 to 40 weight % of chemical resin film slitting yarns so as to manufacture a thick non-woven fabric.

The mixing ratio between the wool yarn and the chemical resin slitting yarn as described above may be controlled, considering the bound state of the non-woven fabric, the resistance against inhaling and exhaling, and the efficiency of capturing dust particles. However, if the amount of the chemical resin slitting yarns exceeds a certain level, then the bound state of the non-woven fabric and the homogeneity of the mixture are aggravated.

On the other hand, if the proportion of the wool yarn exceeds a certain level, the bound state of the non-woven fabric and the homogeneity of the mixture are improved, but the resistance against inhaling and exhaling is increased. Further, the charge inducing property of the chemical resin film slitting yarn deteriorates, with the result that the dust capturing efficiency is lowered.

As the material for the chemical resin film slitting yarn, all chemical resins which can be formed into a thin film may be used. However it is preferable to use a polyolefin, particularly polypropylene which has a good charge inducing property and a good fiber ability.

The thickness of the non-woven fabric is not particularly limited, but a density of 300 to 600 g/m$^2$ is desirable. Further, in order to reinforce the bound state, it is preferable to needle-punch the non-woven fabric.

As the wool yarn, an ordinary one may be used. However, the preferable one is that which is processed by dipping the wool yarn into a bio ceramic base solution which is manufactured by ionizing a semiconductor material and noble metals such a gold, silver and the like, thereby obtaining a wool yarn radiating far infrared rays, resistance against bacteria, and deodorizing properties. Thus if the dust-proof mask thus manufactured is used, it will be desirable in view of the life expectancy of the filter and the health of the wearer.

The above described wool yarn radiates far infrared rays even at the normal temperature to provide the human body with warming effect, and therefore, biological activities are promoted, thereby preventing various illnesses.

The thickness of the chemical resin film slitting yarn is preferably 0.005 to 0.015 mm, its width is preferably 0.005 to 0.5 mm, and its length is preferably 5 to 100 mm.

If the thickness of the slitting yarn is too thin, the process workability becomes bad. On the other hand, if it is too thick, then a interface contact phenomenon occurs between the slitting yarns, and inhaling and exhaling can be adversely affected. The width and length of the slitting yarn are not particularly limited, but, if the width is too narrow or too wide or the length is too short or too long, then the process workability is aggravated.

The method for manufacturing the wool filter for a dust-proof mask according to the present invention is carried out in a manner described below. That is, 40 to 90 weight % of wool yarns is mixed with 10 to 60 weight % of chemical resin slitting yarns, and this mixture is used as the raw material. Then the usual manufacturing process of the thick non-woven fabric is applied on the mixture by carrying out the steps including opening, blending, carding, cross lapping, needle punching and winding in the cited order.

Now the present invention will be described based on five examples, but it should be understood that the present invention will not be limited by the examples.

<EXAMPLE 1>

Polypropylene slitting yarns having dimensions of a thickness of 0.007 mm, a length of 50 mm and a width of 0.01 mm were prepared. Then 10 weight % of the polypropylene slitting yarns is mixed with 90 weight % of the far infrared ray radiating, anti-bacterial and deodorized wool yarns. Then this mixture was made to undergo the usual manufacturing process of the thick non-woven fabric, without including any chemical treatment. That is, the mixture was made to undergo the steps of opening, blending, carding, cross lapping, needle punching, and winding, thereby manufacturing the wool filter for a dust-proof mask according to the present invention.

The non-woven fabric filter thus manufactured was subjected to a physical property test based on KS M 6673, and the result showed that the capturing rate for silica particles was 80%.

<EXAMPLES 2–4>

The proportions of the polypropylene slitting yarns were increased to 20, 30 and 40 weight % respectively, and the proportions of the wool yarns were decreased to 80, 70 and 60 weight % respectively. Then the process of Example 1 was carried out on the mixtures.

The performances of the non-woven fabric filters thus manufactured were measured, and the results are shown in <Table 1> below.

<EXAMPLE 5>

Nylon slitting yarns were used instead of the polypropylene slitting yarns of Example 1, and then, the same process was carried out.

The performance of the non-woven filter is shown in Table 1 below.

TABLE 1

| | Ex. 1 | Ex. 2 | Ex. 3 | Ex. 4 | Ex. 5 | Measuring method |
|---|---|---|---|---|---|---|
| Silica capturing efficiency | 80.5 | 92.44 | 98.10 | 95.25 | 88.71 | KS M 6673 |

According to the present invention as described above, the inhaling and exhaling resistance is lowered, and the dust capturing efficiency is greatly improved, while the filter which radiates far infrared rays, resists bacteria and are deodorized is beneficent for the health of the wearer.

Further, according to the present invention, no chemical is used, and therefore, the filter is not harmful to the human body, and also prevents environmental pollution.

Further, according to the present invention, a continuous mass production is possible by following the usual non-woven process.

Further, the wool filter for a dust-proof mask according to the present invention can be used in dust prevailing places such as coal mines, ship building yards, steel and iron manufacturing plants, wheat powder milling houses, fiber factories, cement manufacturing factories, spray coating places and the like.

The present invention was described in the above based on the specific embodiments, but it should be apparent to one of ordinary skill in the art that various modifications and changes can be added without departing from the scope of the present invention.

What is claimed is:

1. A wool filter for a dust-proof mask, made of non-woven fabric, said non-woven fabric comprising:

40 to 90 weight % of wool yarns; and 10 to 60 weight % of chemical resin film slitting yarns, wherein the chemical resin film slitting yarns have a thickness of 0.005 to 0.015 mm, a width of 0.005 to 0.5 mm and a length of 5 to 100 mm wherein said yarns are mixed together in a random and uniform manner.

2. The wool filter as claimed in claim 1, wherein said wool yarns are far infrared ray radiating, anti-bacterial and deodorized wool yarns which are obtained by dipping the wool yarns into a bio ceramic base solution, said solution prepared by ionizing noble metals and a semiconductor material, wherein after the wool yarns are dipped they are dried.

3. The wool filter as claimed in claim 1, wherein said non-woven fabric is composed of 60 to 80 weight % of said wool yarns, and 20 to 40 weight % of said chemical resin film slitting yarns.

4. The wool filter as claimed in claim 1, wherein said chemical resin film slitting yarns are polyolefinic film slitting yarns.

5. The wool filter as claimed in claim 1, wherein said non-woven fabric is a non-woven fabric weighing 300 to 600 g/m$^2$.

\* \* \* \* \*